United States Patent
Abadi et al.

(10) Patent No.: US 9,983,975 B2
(45) Date of Patent: May 29, 2018

(54) FIXING ANTI-PATTERNS IN JAVASCRIPT

(71) Applicant: International Business Machines Corporation, Armonk, NY (US)

(72) Inventors: Aharon Abadi, Petach Tikva (IL); Moria Abadi, Petach Tikva (IL); Idan Ben-Harrush, Givat Elah (IL)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 14/583,794

(22) Filed: Dec. 29, 2014

(65) Prior Publication Data

US 2016/0188435 A1   Jun. 30, 2016

(51) Int. Cl.
  *G06F 9/45* (2006.01)
  *G06F 11/36* (2006.01)

(52) U.S. Cl.
  CPC .......... *G06F 11/3604* (2013.01); *G06F 8/443* (2013.01)

(58) Field of Classification Search
  None
  See application file for complete search history.

(56) References Cited

U.S. PATENT DOCUMENTS

| | | | | |
|---|---|---|---|---|
| 6,594,824 B1 * | 7/2003 | Volkonsky | ............... | G06F 8/445 717/159 |
| 7,818,723 B2 * | 10/2010 | AliKacem | ............... | G06F 9/524 717/131 |
| 8,255,435 B2 | 8/2012 | Lake | | |
| 8,694,971 B2 | 4/2014 | Chandra et al. | | |
| 2006/0161908 A1 * | 7/2006 | Bearman | ................. | G06F 8/433 717/162 |
| 2006/0253840 A1 | 11/2006 | Cruickshank et al. | | |
| 2010/0042974 A1 | 2/2010 | Gutz et al. | | |
| 2013/0055221 A1 | 2/2013 | Murthy et al. | | |

OTHER PUBLICATIONS

Asger Feldthaus et al., "Tool-supported Refactoring for JavaScript", OOPSLA'11, Oct. 22-27, 2011, Portland, Oregon, USA. Copyright c 2011 ACM.

Von Marc Schönefeld., "Refactoring of Security Antipatterns in Distributed Java Components", University of Bamberg Press Bamberg 2010.

(Continued)

*Primary Examiner* — Qamrun Nahar
(74) *Attorney, Agent, or Firm* — Daniel Kligler

(57) ABSTRACT

Methods, storage systems and computer program products implement embodiments of the present invention that include receiving, by a computer, source code for an application, the source code including multiple instructions to be executed in a single thread. A first static analysis is performed on the application source code in order to identify a given instruction including an asynchronous handler, and a plurality of entry points to the application. Based on the static analysis, an order of execution of the multiple instructions is determined, and an intermediate representation is generated that includes the multiple instructions arranged in the determined order of execution. In some embodiments, a second static analysis can be performed on the intermediate representation that can identify an anti-pattern in the intermediate representation, and then correct the anti-pattern in the source code.

16 Claims, 4 Drawing Sheets

(56) References Cited

OTHER PUBLICATIONS

Davide Arcelli et al., "Antipattern-Based Model Refactoring for Software Performance Improvement", QoSA '12 Proceedings of the 8th international ACM SIGSOFT conference on Quality of Software Architectures, pp. 33-42, 2012.
IBM., "Code Analysis With Pattern Matching to Provide Automated Code Refactoring", IPCOM000178035D Publication Date: Jan. 14, 2009, can be found at: http://ip.com/IPCOM/000178035.

* cited by examiner

US 9,983,975 B2

FIXING ANTI-PATTERNS IN JAVASCRIPT

FIELD OF THE INVENTION

The present invention relates generally to computer programming, and specifically to detecting and fixing anti-patterns in source code for a software application having an asynchronously called function and unknown entry points to the application.

BACKGROUND

Static analysis (also call white box testing) analyzes software system code for dependencies without relying on any external resources or dynamic events. When analyzing software system code such as JavaScript™, static analysis can detect anti-patterns (i.e., inefficiencies) in the code, and replace the detected anti-patterns with alternate code that implements best coding practices (i.e., evolving sets of rules used by developers to improve the quality of software).

The description above is presented as a general overview of related art in this field and should not be construed as an admission that any of the information it contains constitutes prior art against the present patent application.

SUMMARY

There is provided, in accordance with an embodiment of the present invention a method, including receiving, by a computer, source code for an application, the source code including multiple instructions to be executed in a single thread, performing a static analysis on the application source code, identifying, in the static analysis, a given instruction including an asynchronous handler, and a plurality of entry points to the application, determining an order of execution of the multiple instructions, and generating an intermediate representation including the multiple instructions arranged in the determined order of execution.

There is also provided, in accordance with an embodiment of the present invention an apparatus, including a memory, and a processor configured to receive application source code for an application, the source code including multiple instructions to be executed in a single thread, to store the application source code to the memory, to perform a static analysis on the application source code, to identify, in the static analysis, a given instruction including an asynchronous handler, and a plurality of entry points to the application, to determine an order of execution of the multiple instructions, and to generate an intermediate representation including the multiple instructions arranged in the determined order of execution.

There is further provided, in accordance with an embodiment of the present invention a computer program product, the computer program product including a non-transitory computer readable storage medium having computer readable program code embodied therewith, the computer readable program code including computer readable program code configured to receive application source code for an application, the source code including multiple instructions to be executed in a single thread, computer readable program code configured to perform a static analysis on the application source code, computer readable program code configured to identify, in the static analysis, a given instruction including an asynchronous handler, and a plurality of entry points to the asynchronous handler, computer readable program code configured to determine an order of execution of the multiple instructions, and computer readable program code configured to generate an intermediate representation including the multiple instructions arranged in the determined order of execution.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
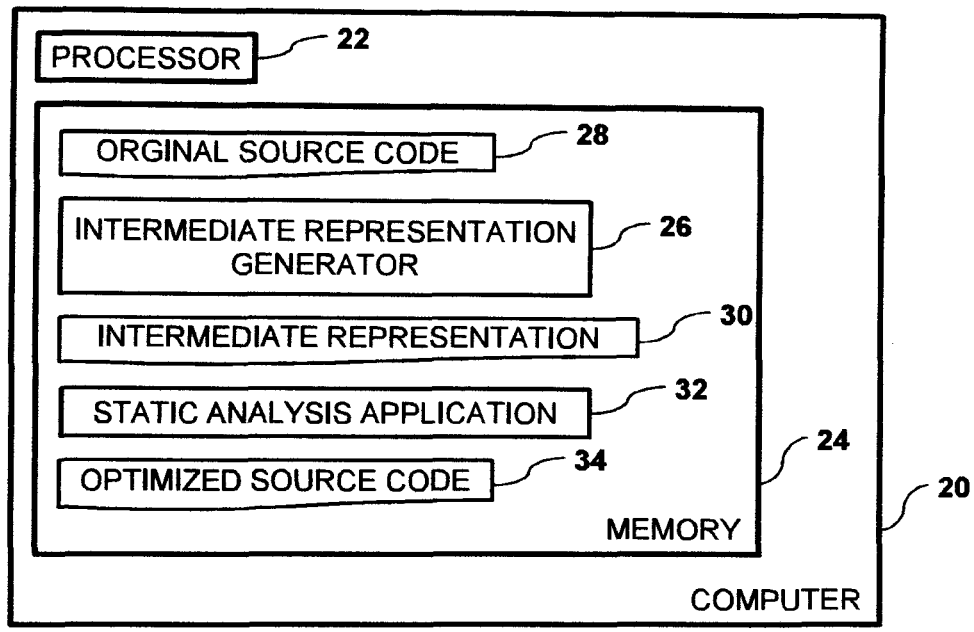
FIG. 1 is a block diagram of a computer system configured to automatically detect and fix anti-patterns in JavaScript™ code, in accordance with an embodiment of the present invention.

Mobile applications are typically written in languages such as JavaScript™, which can have asynchronously called functions, and unknown entry points to the application. The asynchronously called function can typically be invoked via a system event or a user event. As opposed to a synchronously called function that is typically executed sequentially in the same thread that called the synchronously called function (i.e., the commands are executed in the same order as the order of their respective commands in the source code), an asynchronously called function can be executed in the background on a secondary thread while the calling function in a primary thread continues to do other work.

In embodiments herein, an instruction executed by the asynchronously called function may be referred to an asynchronous handler. Additionally or alternatively, the asynchronously called function can be executed after the primary thread completes all its instructions. In other words, the primary thread comprising asynchronously called function can appear to be executing its instructions "out of order".

Processing an asynchronous function call typically comprises executing a handler when the function call returns. Depending on the system and/or the operating system configuration, upon calling the asynchronous function from a given thread, the handler can be executed either in parallel to the given thread, or at the end of the given thread. In embodiments of the present invention, static analysis can be used to find one or more locations (i.e., relative to the given thread) where the handler can be executed.

In an application comprising an asynchronously called function, a given thread may have multiple entry points to the application in order to reach the asynchronously called function. Examples of entry points include, but are not limited to user events such as a mouse click and system events such as loading and presenting a new screen on a display.

Embodiments of the present invention provide methods and systems for detecting and correcting anti-patterns (or any other "poorly behaving" code) in application source code written in a language like JavaScript™. The application source code typically comprises multiple instructions in an application that can be executed in a single thread.

In some embodiments, a first static analysis is performed on the application source code in order to identify an asynchronous handler and a plurality of entry points to the application comprising the asynchronous handler. Based on the first static analysis, an order of execution of the multiple instructions can be determined, and an intermediate representation comprising the multiple instructions arranged in the determined order of execution can be generated. In some embodiments, the order of execution of the multiple instructions can be determined by identifying one or more locations in the application source code where the asynchronous hander can be executed.

The intermediate representation may comprise a graph having one or more data flows and one or more control flows. The graph typically has data flows that connect nodes that correspond to the source code instructions. In embodiments of the present invention, a second static analysis can by performed to analyze the graph (i.e., the intermediate representation) in order to identify an anti-pattern in the intermediate representation.

Since the nodes in the graph correspond to the multiple source code instructions one or more of the multiple source code instructions that comprise the anti-pattern can be identified. The second static analysis can then generate one or more alternate instructions using best coding practices, and replace, in the source code, the one or more identified instructions with the one or more alternate instructions.

System Description

FIG. 1 is a block diagram of a computer system 20 configured to automatically detect and fix anti-patterns in JavaScript™ code, in accordance with an embodiment of the present invention. While embodiments herein describe detecting and fixing anti-patterns in JavaScript™ code, detecting and fixing anti-patterns in any language supporting multiple entry points and asynchronously called functions is considered to be within the spirit and scope of the present invention.

Computer 20 comprises a processor 22 and a memory 24. In operation, processor executes, from memory 24 an intermediate representation generator 26 that converts original source code instructions 28 into an intermediate representation 30. Processor 22 also executes, from memory 24, a static analysis application 32 that analyzes intermediate representation 30, and based on the analysis, generates optimized source code instructions 34 (also referred to herein as alternate instructions 34). Generating intermediate representation 30 and optimized source code instructions 34 is described in detail hereinbelow.

Figure 2:
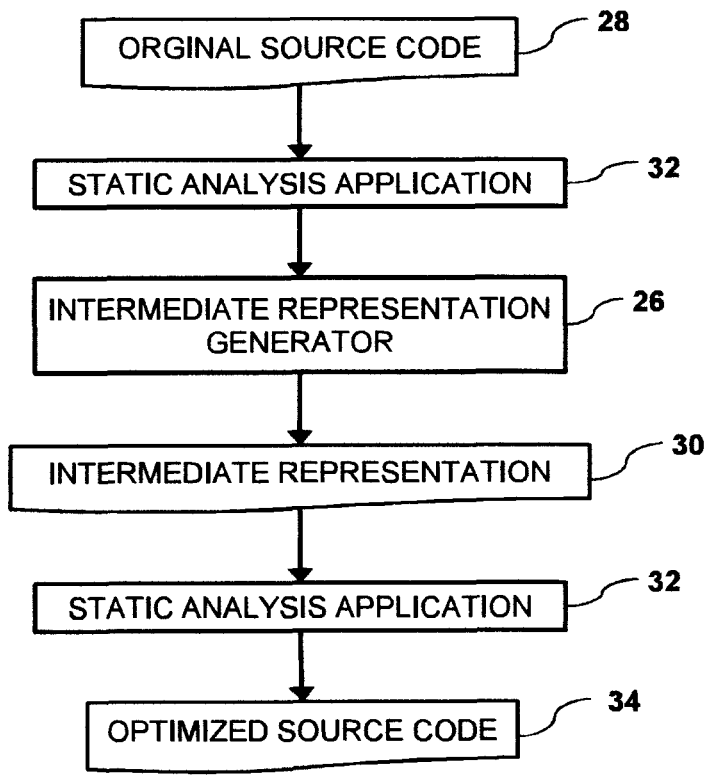
FIG. 2 is a flow diagram that schematically illustrates components of the computer system detecting and fixing the anti-patterns, in accordance an embodiment of the present invention.

FIG. 2 is a flow diagram that schematically illustrates components of computer system 20 detecting and fixing the anti-patterns, in accordance an embodiment of the present invention. Original source code instructions 28 are input into static analysis application 32 in order to identify features comprising an asynchronous handler and, to identify a plurality of entry points to the application (i.e., that includes the asynchronous handler), and the static analysis application inputs the application source code and the identified features to intermediate representation generator 26 that uses the input to generate intermediate representation 30. Intermediate representation 30 is then input into static analysis application that analyzes the intermediate representation, and upon detecting multiple entry points to the application, generates optimized source code instructions 34, as described hereinbelow.

Processor 22 typically comprises general-purpose computers, which are programmed in software to carry out the functions described herein. The software may be downloaded to system 20 in electronic form, over a network, for example, or it may be provided on non-transitory tangible media, such as optical, magnetic or electronic memory media. Alternatively, some or all of the functions of processor 22 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Autofixing Anti-Patterns

Figure 3:
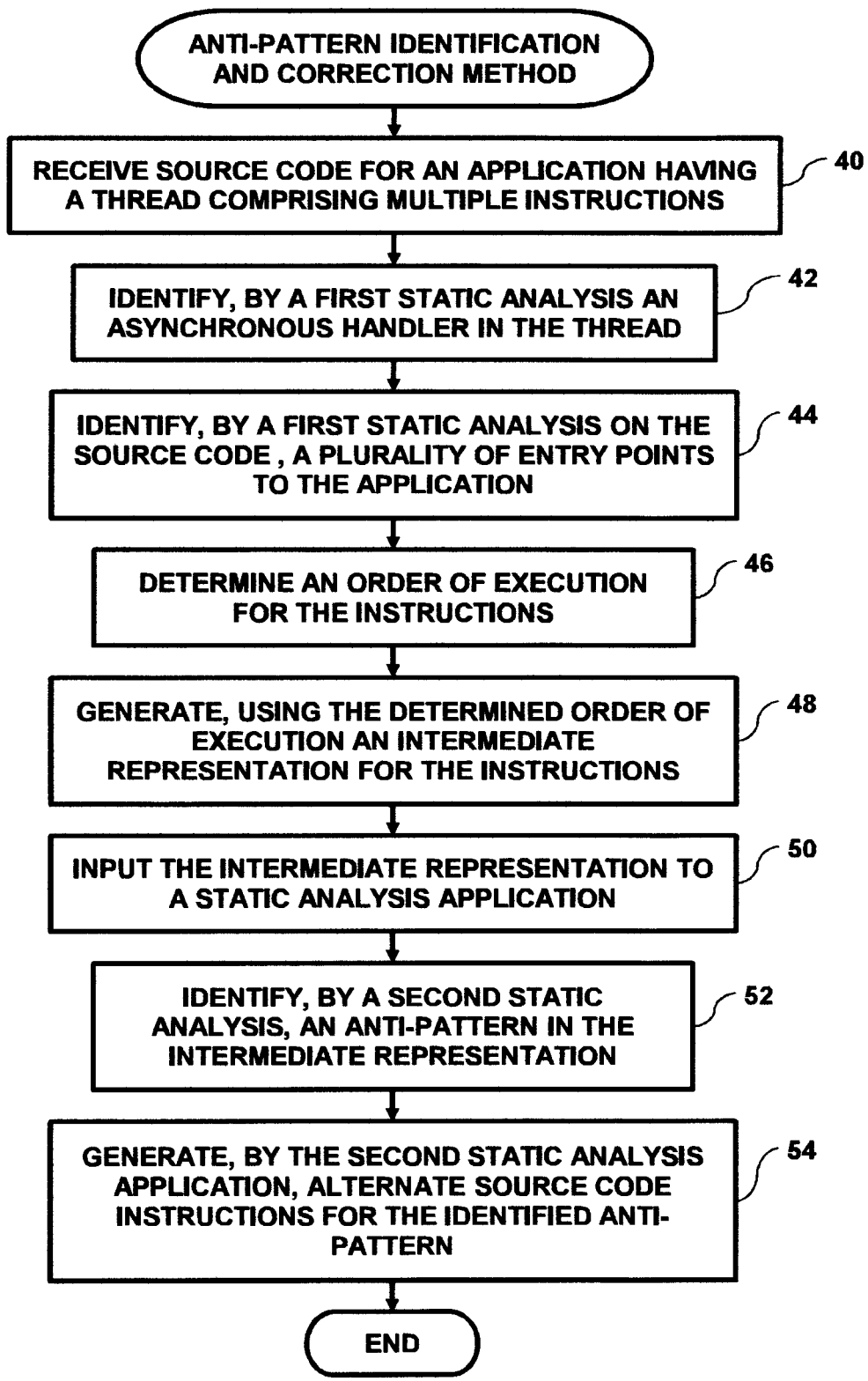
FIG. 3 is a flow diagram that schematically illustrates a method of detecting and correcting the anti-patterns in the JavaScript™ code, in accordance an embodiment of the present invention.

FIG. 3 is a flow diagram that schematically illustrates a method of detecting and correcting the anti-patterns in source code instructions 28, in accordance an embodiment of the present invention. In a receive step 40, processor 22 receives source code 28 for an application, and stores the received source code to memory 24. In embodiments of the present invention, source code 28 comprises multiple instructions that can be executed as a single thread.

In multitasking computer systems, each instance of an application is known as a process, and each of the processes comprises one or more threads. Each of the threads comprises a sequence of executable code that is typically responsible for one aspect of a given application. For example an application that performs a complex long calculation may be split into two threads comprising a first thread configured to keep a user interface responsive, and one or more second threads configured to perform the calculation.

Figure 4:
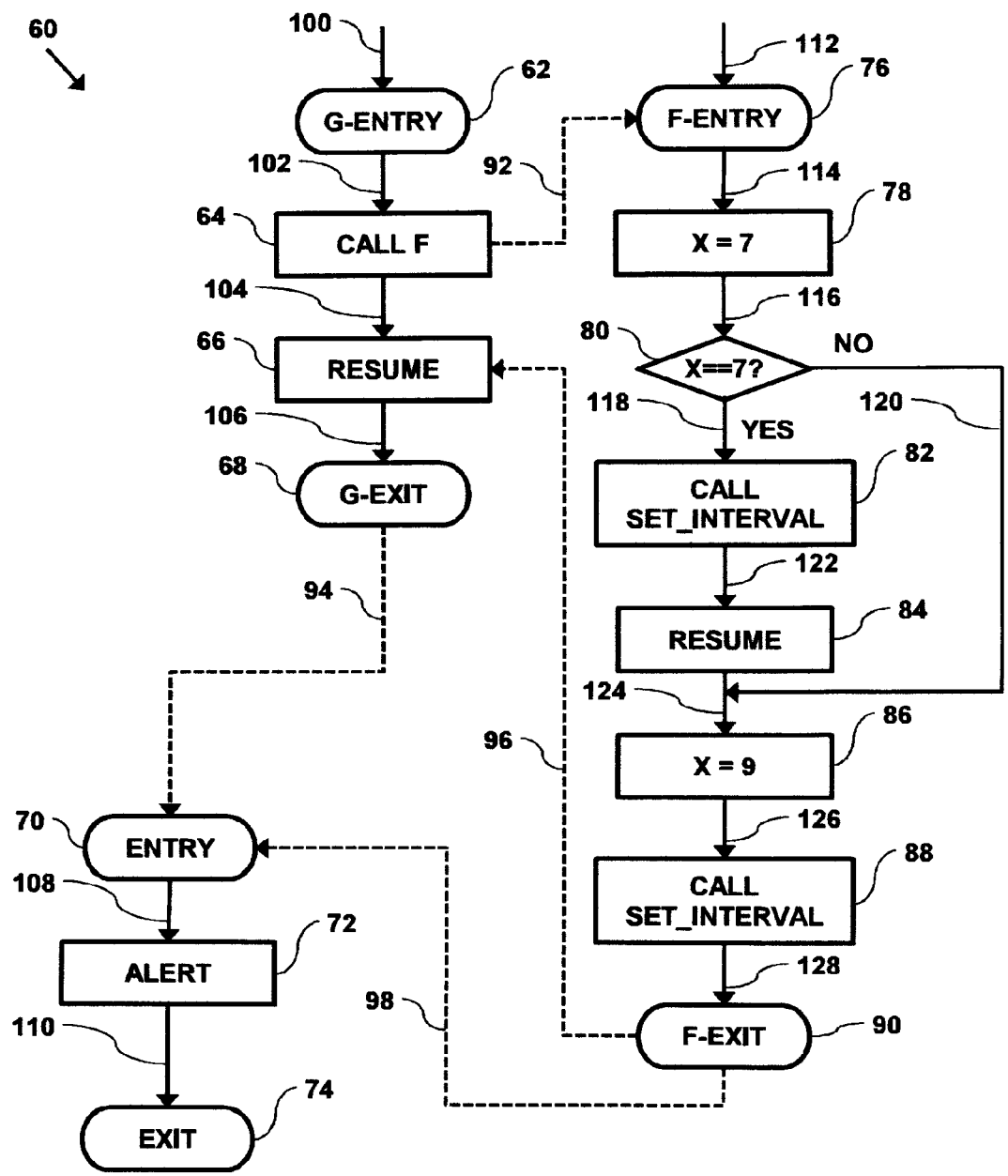
FIG. 4 is a first example of an intermediate representation of JavaScript™ code, in accordance with an embodiment of the present invention.

In a first identification step 42, processor 22 performs a first static analysis and identifies an asynchronous handler (in an asynchronously called function) in source code 28. In a second identification step 44, the processor, while performing the first static analysis, identifies, in the source code, a plurality of entry points to the application. For example, a first of the entry points may comprise a user event (e.g., a mouse click), and a second of the entry points may comprise a system event (e.g., processor 22 loading an input screen). An example of an asynchronously called function is shown in FIG. 4, and described hereinbelow in the description referencing FIG. 4.

In a determination step 46, processor 22 determines, based on the first static analysis, an order of execution of the instructions (including the asynchronously called function) in source code 28. For example, source code 28 comprises a thread having instructions "A", "B" and "C", and instruction "B" comprises a call to an asynchronously called function. If processor 22 determines that the asynchronously called function is executed subsequent to completing the thread, the order of execution may be "A"-"C"-"B".

In a first generation step 48, processor 22 generates, using the determined order of execution for the instructions in source code 28, intermediate representation 30. As described supra, processor 22 can execute intermediate representation manager 26 to generate intermediate representation 30.

Intermediate representation 30 may comprise a graph having one or more control flows, and one or more data flows. In some embodiments, the graph comprises a plurality of starting points, wherein each of the starting points in the graph corresponds to a given entry point in source code 28. Examples of the graphs are shown in FIGS. 3 and 4, and described hereinbelow.

In an input step 50, processor 22 inputs intermediate representation 30 into static analysis application 32, and in a third identification step 52, the processor performs a second static analysis and identifies an anti-pattern in the intermediate representation. An example of an anti-pattern is described hereinbelow in the description referencing FIG. 5.

Finally, in a second generation step 54, the second static analysis locates one or more of the instructions in source code associated with the anti-pattern, generates, using best coding practices (e.g., for JavaScript™), one or more alternate source code instructions for the one or more located instructions, and replaces the one or more located instructions with the one or more alternate instructions, thereby generating optimized source code 34.

In embodiments of the present invention, the one or more alternate instructions and the one or more located instructions are functionally equivalent. In other words, replacing the one or more one or more located instructions with the one or more alternate instructions can help increase performance without affecting any results produced when executing optimized source code 34. In the example described hereinbelow in the description referencing FIG. 4, static analysis application 32 increases performance by replacing a "while loop" with a "for loop". The "while loop" and the "for loop" are functionally equivalent in the sense that they are both looping structures. Depending on the analyzed source code 28, static analysis can determine which of the looping structures is more efficient for the analyzed source code.

FIG. 4 is a first example of an intermediate representation of JavaScript™ code, in accordance with an embodiment of the present invention. In the example shown in FIG. 4, the intermediate representation comprises a graph 60 for the following source code 28 (also referred to herein as a first source listing):

```
<!DOCTYPE html>
<html>
<body>
<button onclick=f( )>Try it</button>
<script>
function g( ){
f( );
}
function f( ) {
    x=7;
    if (x==7) {
        setInterval(function ( ){alert('Hello');},3000);
    }
    setInterval(g( ),2000);
    x=9;
}
g( );
</script>
</body>
</html>
```

Graph 60 comprises nodes 62-90, control flows 92-98 and data flows 100-128. Graph 60 shows a first thread comprising function "F" that starts at entry node 76 and finishes at exit node 90, and a second thread comprising Function "G" (that calls function "F") that starts at entry node 62 and finishes at exit node 68. In the first source listing, the asynchronous function call is
    function ( ){alert('Hello');}
in the statement:
    setInterval (function ( ){alert('Hello');},3000);
that has a corresponding node 82 in graph 60. In this example, the asynchronous handler is
    alert('Hello');
In the statement, the "Hello" alert is performed 3,000 time units (e.g., milliseconds) after the function is called. Therefore, the "Hello" alert will typically be performed after the thread in listing 1 has been completed.

In the example shown in FIG. 4, if, during execution, the entry point comprises node 62, then processor 22 executes the asynchronous handler in node 72 upon completing to execute function "G" (function "F" is called within function "G"). However, if the entry point is node 76, processor 22 executes the asynchronous handler in node 72 after executing function "F" (function "F" is not called if the entry point is node 76). While the example shown in FIG. 4 shows processor 22 executing the asynchronous handler after completing a given thread, executing the asynchronous handler at any point in the given thread is considered to be within the spirit and scope of the present invention.

In graph 60, nodes 62 and 76 comprise two entry points to the thread in listing 1. Node 62 references the statement
    function g( ){
which can be called by another function (not shown), and node 76 references the statement function
    f( ) {
which can be directly via a mouse click (i.e., without calling function g( )first), as referenced by the statement
    <button onclick=f( )>Try it</button>
As shown in graph 60, node 82 (i.e., the node associated with the asynchronous function call) can be reached directly via entry point node 76, or via control flow 92 from entry point node 62.

Figure 5:
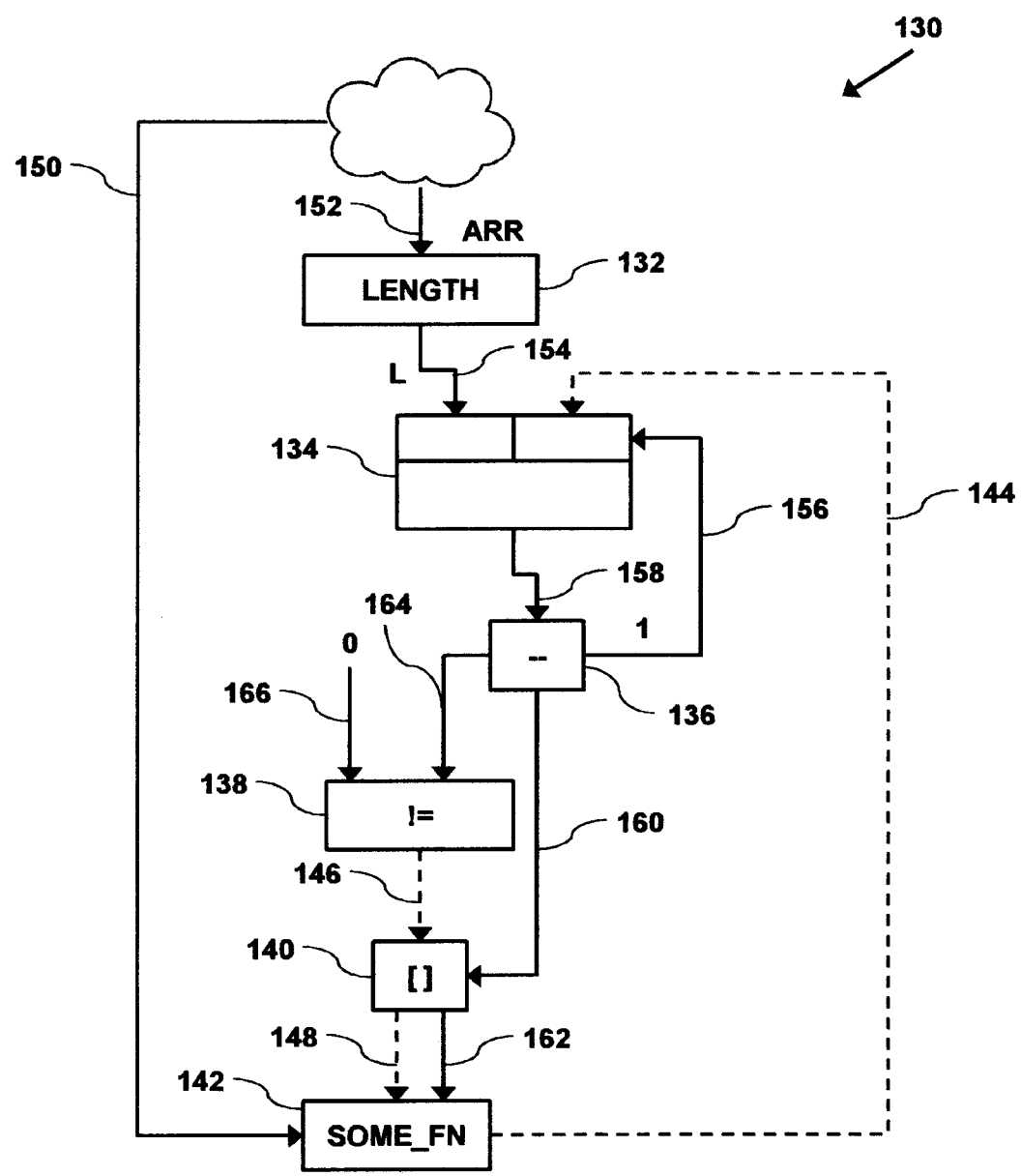
FIG. 5 is a second example of an intermediate representation of JavaScript™ code, in accordance with an embodiment of the present invention.

FIG. 5 is a second example of an intermediate representation of JavaScript™ code, in accordance with an embodiment of the present invention. In the example shown in FIG. 5, the intermediate representation comprises a graph 130 for the following source code 28 (also referred to herein as a second source listing):

```
var l=arr.length;
while(l--){
    some_Fn(arr[l]);
}
```

Graph 130 comprises nodes 132-142 (including join point 134 and condition point 138), control flows 144-148, and data flows 150-168. In embodiments of the present invention, processor 22 can perform a control flow analysis we to find the test of the loop, perform a data flow analysis to find the loop index calculation, and then generate (via static analysis application 32) the following alternate instructions that can replace the while loop in the second source listing:
    for (var i=0;i<arr.length;i++){
        someFn(arr[i]);
In the example shown in source listing 2 and FIG. 5, static analysis application 32 detected a "while loop", and replaced the while loop with a "for loop" which is typically more efficient (i.e., executes faster) if the loop has many iterations.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving, by a computer, Hypertext Markup Language (HTML) and JavaScript source code instructions, wherein one or more of the JavaScript source code instructions comprise an asynchronous handler, and wherein the HTML comprises a plurality of entry points into the JavaScript source code instructions;
performing a static analysis on the received HTML to identify the entry points from the HTML into the JavaScript source code instructions;
identifying, starting with each of the entry points in the HTML, respective control flows and data flows for the JavaScript source code instructions;
generating, based on the static analysis, a graph including the control flows and the data flows identified for each of the entry points;
analyzing the control and the data flows in the graph to identify an anti-pattern comprising one or more JavaScript source code instructions that result in inefficient or poor behavior while executing the application; and
replacing, by the computer, the anti-pattern with alternative JavaScript source code instructions that are functionally equivalent and more efficient than the anti-pattern.

2. The method according to claim 1, wherein each of the plurality of entry points is selected from a list consisting of a user event and a system event.

3. The method according to claim 1, wherein performing the static analysis comprises determining a plurality of possible execution locations of the asynchronous handler in the source code.

4. The method according to claim 1, wherein the static analysis comprises a first static analysis, and wherein analyzing the graph and identifying the one or more alternative JavaScript source code instructions comprises performing a second static analysis on the graph.

5. An apparatus, comprising:
a memory, and
a processor configured:
to receive Hypertext Markup Language (HTML) and JavaScript source code instructions, wherein one or more of the JavaScript source code instructions comprise an asynchronous handler, and wherein the HTML comprises a plurality of entry points into the JavaScript source code instructions,
to store the received HTML and JavaScript source code instructions to the memory,
to perform a static analysis on the received HTML to identify the entry points from the HTML into the JavaScript source code instructions,
to identify, starting with each of the entry points in the HTML, respective control flows and data flows for the JavaScript source code instructions;
to generate, based on the static analysis, a graph including the control flows and the data flows identified for each of the entry points;
to analyze the control and the data flows in the graph to identify an anti-pattern comprising one or more JavaScript source code instructions that result in inefficient or poor behavior while executing the application, and
to replace, in the source code, anti-pattern with the one alternative JavaScript source code instructions that are functionally equivalent and more efficient than the anti-pattern.

6. The apparatus according to claim 5, wherein each of the entry points is selected from a list consisting of a user event and a system event.

7. The apparatus according to claim 5, wherein the processor is configured to perform the static analysis by determining a plurality of possible execution locations of the asynchronous handler in the source code.

8. The apparatus according to claim 5, wherein the static analysis comprises a first static analysis, and wherein the processor is configured to analyze the graph and to identify the one or more alternative JavaScript source code instructions by performing a second static analysis on the graph.

9. A computer program product, the computer program product comprising:
a non-transitory computer readable storage medium having computer readable program code embodied therewith, the computer readable program code comprising:
computer readable program code configured to receive Hypertext Markup Language (HTML) and JavaScript source code instructions, wherein one or more of the JavaScript source code instructions comprise an asynchronous handler, and wherein the HTML comprises a plurality of entry points into the JavaScript source code instructions;
computer readable program code configured to perform a static analysis on the received HTML to identify the entry points from the HTML into the JavaScript source code instructions;
computer readable program code configured to identify, starting with each of the entry points in the HTML, respective control flows and data flows for the JavaScript source code instructions;
computer readable program code configured to generate, based on the static analysis, a graph including the control flows and the data flows identified for each of the entry points;
computer readable program code configured to analyze the control and the data flows in the graph to identify an anti-pattern comprising one or more JavaScript source code instructions that result in inefficient or poor behavior while executing the application; and
computer readable program code configured to replace, in the source code, the anti-pattern with more alternative JavaScript source code instructions that are functionally equivalent and more efficient than the anti-pattern.

10. The computer program product according to claim 9, wherein each of the plurality of entry points is selected from a list consisting of a user event and a system event.

11. The computer program product according to claim 9, wherein the computer readable program code is configured to perform the static analysis by determining a plurality of possible execution locations of the asynchronous handler in the source code.

12. The computer program product according to claim 9, wherein the static analysis comprises a first static analysis, and wherein the computer readable program code is configured to analyze the graph and to identify the one or more alternative JavaScript source code instructions by performing a second static analysis on the graph.

13. The method according to claim 1, wherein identifying the anti-pattern comprises performing a control flow analysis.

14. The method according to claim 1, wherein the identified anti-pattern comprising one or more JavaScript source code instructions comprises a while loop, and wherein the alternative JavaScript source code instructions that are functionally equivalent and more efficient than the anti-pattern comprise a for loop.

15. The apparatus according to claim 5, wherein the identified anti-pattern comprising one or more JavaScript source code instructions comprises a while loop, and wherein the alternative JavaScript source code instructions that are functionally equivalent and more efficient than the anti-pattern comprise a for loop.

16. The computer program product according to claim 9, wherein the identified anti-pattern comprising one or more JavaScript source code instructions comprises a while loop, and wherein the alternative JavaScript source code instructions that are functionally equivalent and more efficient than the anti-pattern comprise a for loop.

\* \* \* \* \*